US010778896B2

(12) United States Patent
Watanabe

(10) Patent No.: US 10,778,896 B2
(45) Date of Patent: Sep. 15, 2020

(54) IMAGE PROCESSING APPARATUS AND IMAGE PROCESSING METHOD

(71) Applicant: CANON KABUSHIKI KAISHA, Tokyo (JP)

(72) Inventor: Takeshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 15/954,247

(22) Filed: Apr. 16, 2018

(65) Prior Publication Data
US 2018/0302567 A1 Oct. 18, 2018

(30) Foreign Application Priority Data

Apr. 18, 2017 (JP) ................................ 2017-082252
Feb. 20, 2018 (JP) ................................ 2018-028211

(51) Int. Cl.
H04N 5/228 (2006.01)
H04N 5/232 (2006.01)
H04N 5/357 (2011.01)
G06T 5/00 (2006.01)
H04N 5/217 (2011.01)

(52) U.S. Cl.
CPC ......... H04N 5/23287 (2013.01); G06T 5/006 (2013.01); H04N 5/217 (2013.01); H04N 5/23258 (2013.01); H04N 5/23267 (2013.01); H04N 5/3572 (2013.01)

(58) Field of Classification Search
CPC ........... H04N 5/23254; H04N 5/23264; H04N 5/23287; H04N 5/2254; G06T 5/006; G02B 7/09; G02B 7/14; G02B 27/646
See application file for complete search history.

(56) References Cited

U.S. PATENT DOCUMENTS 9,467,622 B2 * 10/2016 Miyasako .......... H04N 5/23258
2005/0231616 A1 * 10/2005 Iwai ...................... H04N 5/217
348/241
2009/0135272 A1 5/2009 Ozluturk
(Continued)

FOREIGN PATENT DOCUMENTS

CN 101510959 A 8/2009
CN 101661162 A 3/2010
(Continued)

OTHER PUBLICATIONS

Combined Search and Examination Report issued in corresponding application No. GB1806295.0 dated Sep. 27, 2018, 5 pages.
(Continued)

Primary Examiner — Kelly L Jerabek
(74) Attorney, Agent, or Firm — Carter, DeLuca & Farrell LLP

(57) ABSTRACT

Provided is an image processing apparatus that generates a natural-looking image even from an image in which image shake has been corrected and distortion has been intentionally added. A processor of this image processing apparatus performs transformation processing on an image so as to generate an image having a point symmetric distortion centered on the center coordinates of the image, even for an image in which the center position of aberration of an optical system and the center position of the image do not match.

22 Claims, 10 Drawing Sheets

(56) References Cited

U.S. PATENT DOCUMENTS

| | | | | |
|---|---|---|---|---|
| 2010/0295956 A1* | 11/2010 | Goto | ................. | H04N 5/23248 348/208.6 |
| 2014/0111672 A1* | 4/2014 | Seki | ...................... | H04N 9/646 348/242 |
| 2014/0211038 A1* | 7/2014 | Watanabe | ............... | G06T 5/001 348/222.1 |
| 2015/0009345 A1* | 1/2015 | Tsubaki | ............. | H04N 5/23258 348/208.2 |
| 2017/0309002 A1* | 10/2017 | Koyano | ................... | G02B 7/09 |
| 2017/0310897 A1* | 10/2017 | Koishi | ............... | H04N 5/23287 |

FOREIGN PATENT DOCUMENTS

| | | |
|---|---|---|
| CN | 103186784 A | 7/2013 |
| CN | 103562931 A | 2/2014 |
| CN | 104113703 A | 10/2014 |
| CN | 107306334 A | 10/2017 |
| JP | 2006-033759 A | 2/2006 |
| JP | 2008287430 A | 11/2008 |

OTHER PUBLICATIONS

Notffication of First Office Action issued by the China National Intellectual Property Administration dated Apr. 22, 2020 in corresponding CN Patent Application No. 201810348960.5, with English translation.

* cited by examiner

CAPTURED IMAGE

OUTPUT IMAGE

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

It is known to perform accurate image shake correction on an image whose distortion is caused by aberration of an imaging optical system (Japanese Patent Laid-Open No. 2006-33759). In addition, it is known that image distortion caused by aberration can be classified into barrel distortion and pincushion distortion, and that barrel distortion appears more natural. Therefore, in Japanese Patent Laid-Open No. 2006-33759, barrel distortion is intentionally added to an image to which image shake correction has been applied.

The degree of image distortion caused by aberration of an imaging optical system depends on the distance of the object from the optical axis (image height). Therefore, when adding an effect imitating image distortion caused by aberration, the degree of distortion is determined by assuming that the optical axis is orthogonal to the center of the image. However, in the case of performing image shake correction on a moving image, the positional relationship between the optical axis of the imaging optical system and the center of each moving image frame changes over time due to image shake correction. Therefore, if barrel distortion effect is applied to moving image frames having undergone image shake correction by assuming that the optical axis is always orthogonal to the center of the image, the relationship between the image height and the degree of distortion changes over time. In particular, in areas whose image height is large, such a time variation of the distortion appears to be unnatural. Japanese Patent Laid-Open No. 2006-33759 does not mention such a problem at all.

SUMMARY OF THE INVENTION

The present invention provides an image processing apparatus and an image processing method that make it possible to suppress the issue of such conventional technology, and generate a moving image that appears natural after image shake correction.

According to an aspect of the present invention, there is provided an image processing apparatus comprising: a processor for generating a second image by applying one or more processes to a first image captured via an optical system, wherein if the first image is an image that includes distortion caused by aberration of the optical system and the image center coordinates and the coordinates corresponding to a center of the aberration do not match, the processor generates the second image to have point symmetric distortion centered on the image center coordinates by applying a transformation process to the first image.

According to another aspect of the present invention, there is provided an image processing apparatus comprising: at least one processor; a first memory; and a nonvolatile second memory that includes instructions for the at least one processor to, by being executed by the at least one processor: read out a first image that includes distortion caused by aberration of an optical system, from the first memory; generate a second image by performing, on the first image, a process for correcting distortion caused by aberration of the optical system; generate a third image by cropping a portion of the second image according to a shake amount of an image capturing apparatus; and generate a fourth image that includes a point symmetric distortion centered on the image center coordinates, by performing a transformation process on the third image.

According to a further aspect of the present invention, there is provided an image processing apparatus comprising: at least one processor; a first memory; a nonvolatile second memory that includes instructions for the at least one processor to, by being executed by the at least one processor: read out a first image that includes distortion caused by aberration of an optical system, from the first memory; in the first image, correct distortion caused by aberration of the optical system, crop a portion of the image according to a shake amount of an image capturing apparatus, and perform coordinate conversion calculation for adding a point symmetric distortion centered on the image center coordinates; and apply, to the first image, a transformation process that is based on a result of the coordinate conversion calculation.

According to another aspect of the present invention, there is provided an image processing apparatus comprising: at least one processor; a first memory; and a nonvolatile second memory that includes instructions for the at least one processor to, by being executed by the at least one processor: read out, from the first memory, a first image captured using an optical system equipped with an anti-vibration mechanism for reducing shake of an image capturing apparatus; generate a second image by performing, on the first image, a process for correcting distortion caused by aberration of the optical system; and generate a third image that includes a point symmetric distortion centered on the image center coordinates by performing a transformation process on the second image.

According to a further aspect of the present invention, there is provided an image processing apparatus comprising: at least one processor; a first memory; and a nonvolatile second memory that includes instructions for the at least one processor to, by being executed by the at least one processor: read out, from the first memory, a first image captured using an optical system equipped with an anti-vibration mechanism for reducing shake of an image capturing apparatus; in the first image, correct distortion caused by aberration of the optical system, and perform coordinate conversion calculation for adding a point symmetric distortion centered on the image center coordinates; and apply, to the first image, a transformation process that is based on a result of the coordinate conversion calculation.

According to another aspect of the present invention, there is provided an image processing method comprising: generating a second image by applying one or more processes to a first image captured via an optical system, wherein if the first image is an image that includes distortion caused by aberration of the optical system and the image center coordinates and the coordinates corresponding to a center of the aberration do not match, the second image that includes a point symmetric distortion centered on the image center coordinates is generated by applying a transformation process to the first image.

According to a further aspect of the present invention, there is provided a storage medium for storing a program that can be executed by a processor, wherein, when executed by the processor, the program causes the processor to execute an image processing method comprising: generating a second image by applying one or more processes to a first image captured via an optical system, wherein if the first image is an image that includes distortion caused by aberration of the optical system and the image center coordinates and the coordinates corresponding to a center of the aberration do not match, the second image that includes a point symmetric distortion centered on the image center coordinates is generated by applying a transformation process to the first image.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Figure 1:
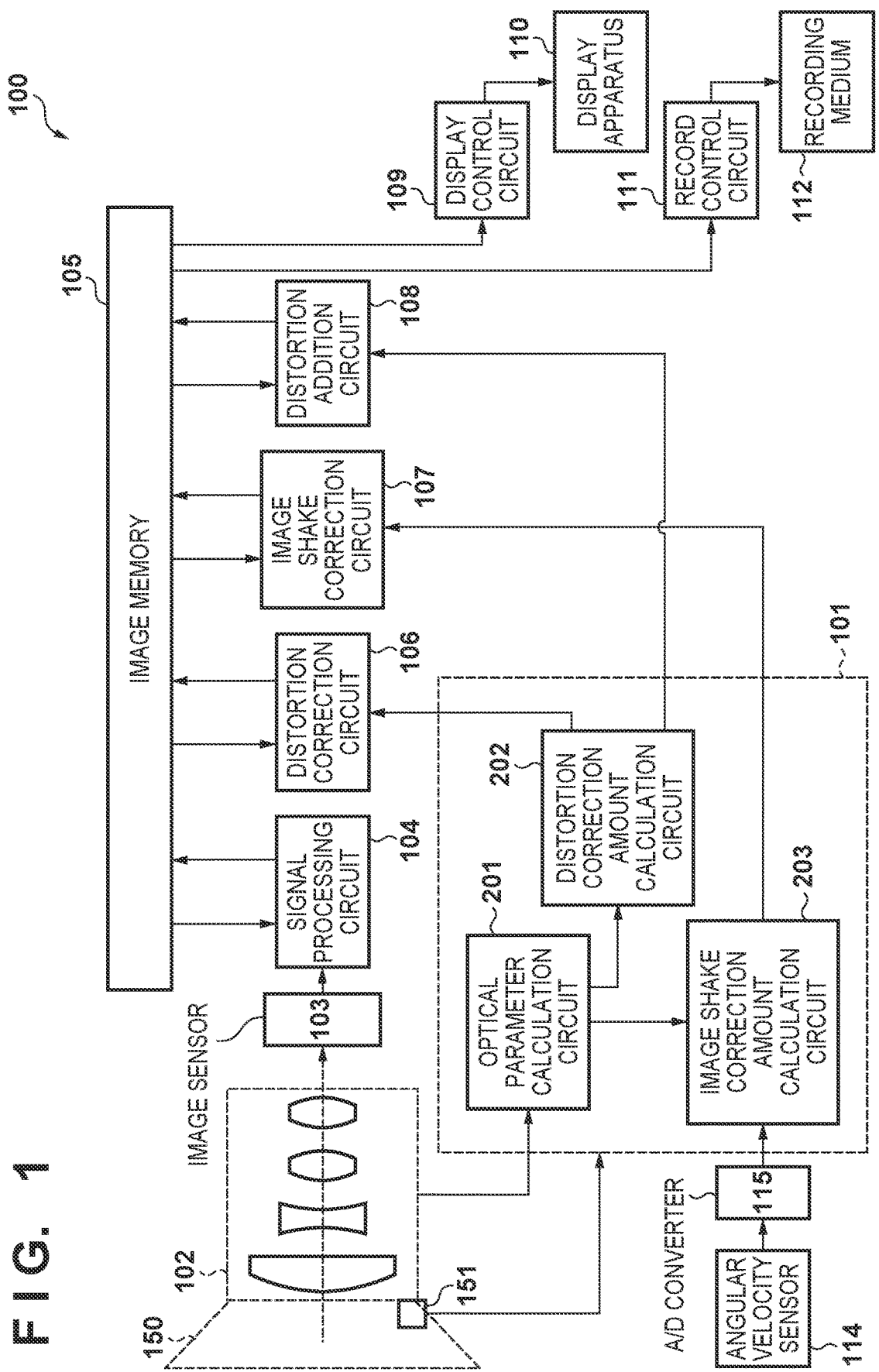
FIG. 1 is a block diagram showing a configuration example of an image capturing apparatus according to an embodiment of the present invention.

Exemplary embodiments of the present invention will now be described in detail in accordance with the accompanying drawings. In the drawings, the same reference numerals are assigned to the same members, and redundant description is omitted. Note that, in this specification, movement of an image capturing apparatus is referred to as "shake", and the influence of "shake" on a captured image is referred to as "image shake". A configuration applied to a digital video camera that is an example of an image processing apparatus according to an embodiment of the present invention will be described below, but the present invention can be applied to any electronic device that can perform image shake correction. Such electronic devices include image capturing apparatuses, as a matter of course, and personal computers, tablet terminals, mobile phones, game machines, drive recorders, robots, drones, and the like, and are not limited thereto.

First Embodiment

FIG. 1 is a block diagram showing an example of a functional configuration of a video camera 100 as an example of an image processing apparatus according to an embodiment of the present invention.

In FIG. 1, a system control circuit 101 has a programmable processor such as a CPU, and a RAM and a ROM. By deploying a program stored in the ROM to the RAM, and the CPU executing the program, the system control circuit 101 controls operations of constituent elements of the video camera 100, and achieves functions of the video camera 100. Therefore, operations of the video camera 100 to be described below are executed mainly by the system control circuit 101 unless explicitly stated otherwise. Note that reference numerals 201 to 203 assigned to the blocks of the system control circuit 101 in FIG. 1 indicate schematically shown functional blocks achieved by the system control circuit 101, from among the functional blocks of an image shake correction apparatus, and a description thereof will be given later in detail.

A photographing lens 102 (an imaging optical system) includes a variable magnification lens, a focus lens, and the like that are driven under control of the system control circuit 101, and forms a subject image on the imaging plane of an image sensor 103. The photographing lens 102 may or may not be detachable.

The image sensor 103 is an XY address type CMOS (Complementary Metal Oxide Semiconductor) image sensor, for example. The image sensor 103 includes a plurality of pixels arranged therein, and an optical image formed by the photographing lens 102 is subjected to photoelectric conversion in the pixels, and thereby analog image signals are obtained.

A signal processing circuit 104 applies signal processing such as noise reduction, A/D conversion, color interpolation, white balance adjustment, and gamma correction to analog image signals that are output from the image sensor 103, so as to generate digital image signals (image data). The signal processing circuit 104 stores the generated image data to an image memory 105.

A distortion correction circuit 106 applies processing for correcting distortion caused by aberration of the photographing lens 102 (distortion correction processing) to image data stored in the image memory 105, and stores, to the image memory 105, the image data generated as a result. The method of distortion correction processing is not particularly limited, and a known method can be used. As an example, a position that is distanced from the position of a pixel of interest in the image height direction (on a line that connects a correction center and the coordinates of the pixel of interest) by a distance that can be determined based on the image height of the pixel of interest (the distance between the correction center and the pixel of interest) is obtained. There is a method for obtaining the signal level of the distanced position by performing interpolation using the signal levels of pixels in the periphery of the distanced position, and setting the signal level obtained from this interpolation as the signal level of the pixel of interest. A movement amount (correction amount) at the time of correction takes a value that depends on the magnitude of the image height, and is calculated by a distortion correction amount calculation circuit 202.

The distortion correction amount calculation circuit 202 has correction amounts prepared in advance for a plurality of discrete image height values, and if there is no correction amount corresponding to the image height of a pixel of interest, calculates a correction amount corresponding to the image height by interpolating prepared correction amounts. Note that a correction amount for a desired image height may be calculated using an n order polynomial approximating the relationship between the image height and the correction amount, in place of interpolation. Note that not only the intersection between the optical axis of the photographing lens 102 and an image but also any coordinates in the image can be designated as a correction center that determines the magnitude of an image height when calculating a correction amount. A correction center is provided by the distortion correction amount calculation circuit 202 to be described later.

An image shake correction circuit 107 corrects image shake of an image in which distortion was corrected by the distortion correction circuit 106, the image shake having been caused by shake of the video camera 100. For example, the image shake correction circuit 107 crops and reads out, from the image memory 105, an image in which distortion was corrected by the distortion correction circuit 106, and changes the cropping position of the image so as to offset shake of the video camera 100. Note that the correction is not limited to correction of translation components of shake performed by changing the cropping position, and a configuration may be adopted in which rotational components around the optical axis of shake are corrected by affine transformations, or tilt components of shake (keystone distortion of an image) are corrected by projection conversion. The image shake correction circuit 107 stores an image in which image shake was corrected, to the image memory 105.

A distortion addition circuit 108 reads out, from the image memory 105, an image in which distortion and image shake have been respectively corrected by the distortion correction circuit 106 and the image shake correction circuit 107, adds the effect of distortion caused by the photographing lens 102 to this image, and stores the image to the image memory 105. The distortion addition circuit 108 can add a distortion effect to an image by obtaining, as the signal level of a pixel of interest, a signal level at a position distanced from the position of the pixel of interest in the direction opposite to distortion correction processing. In addition, the degree of a distortion effect that is added by the distortion addition circuit 108 depends on the distance between a pixel of interest and a correction center, but a configuration is adopted in which any coordinate position in an image that is output from the image shake correction circuit 107 can be designated as a correction center. A correction center is obtained from the distortion correction amount calculation circuit 202, which will be described later.

A record control circuit 111 writes/reads out moving image data, still image data, metadata, and the like that are stored in the image memory 105, to/from a recording medium 112. The recording medium 112 may be a nonvolatile memory, a magnetic recording medium, an optical recording medium, or the like, and the recording medium 112 may be removable.

A display control circuit 109 causes a display apparatus 110 such as a liquid crystal display (LCD) to display an image to be displayed that is based on moving image data or still image data stored in the image memory 105, a GUI screen such as a menu screen, and the like. In this embodiment, the record control circuit 111 writes, to the recording medium 112, an image to which a distortion effect was added by the distortion addition circuit 108, and the display control circuit 109 causes the display apparatus 110 to display the image to which the distortion effect was added by the distortion addition circuit 108.

An angular velocity sensor 114 generates shake signals that represents a shake of the video camera 100. The angular velocity sensor 114 exists on a plane orthogonal to the optical axis, and two straight lines orthogonal to each other serve as detection axes. An A/D converter 115 samples the shake signals generated by the angular velocity sensor 114, converts the sampled shake signals into digital data, and supplies the digital data as shake data to the image shake correction amount calculation circuit 203.

An optical parameter calculation circuit 201, the distortion correction amount calculation circuit 202, and the image shake correction amount calculation circuit 203 may be constituted by hardware equipped with dedicated calculation circuits for achieving their functions, or may be configured to be achieved by the programmable processor of the system control circuit 101 executing programs. In this embodiment, description will be given assuming that the optical parameter calculation circuit 201, the distortion correction amount calculation circuit 202, and the image shake correction amount calculation circuit 203 are constituted by hardware equipped with dedicated calculation circuits for achieving their functions.

The optical parameter calculation circuit 201 calculates optical parameters such as a focal length and a subject distance of the photographing lens 102, and supplies the optical parameters to the distortion correction amount calculation circuit 202 and the image shake correction amount calculation circuit 203.

The distortion correction amount calculation circuit 202 supplies correction data and a correction center position for distortion correction and distortion addition to the distortion correction circuit 106 and the distortion addition circuit 108 based on optical parameters.

The image shake correction amount calculation circuit 203 supplies a correction amount for correcting image shake caused by shake of the video camera 100 to the image shake correction circuit 107 based on shake data supplied from the A/D converter 115.

In the configuration in FIG. 1, the distortion correction circuit 106, the image shake correction circuit 107, the distortion addition circuit 108, the optical parameter calculation circuit 201, the distortion correction amount calculation circuit 202, the image shake correction amount calculation circuit 203, and the system control circuit 101 constitute the image shake correction apparatus.

A conversion lens 150 is an auxiliary lens that is detachable from the photographing lens 102. The system control circuit 101 can detect whether or not a conversion lens is attached, for example, according to the state of a switch 151 provided on the photographing lens 102.

Figure 2:
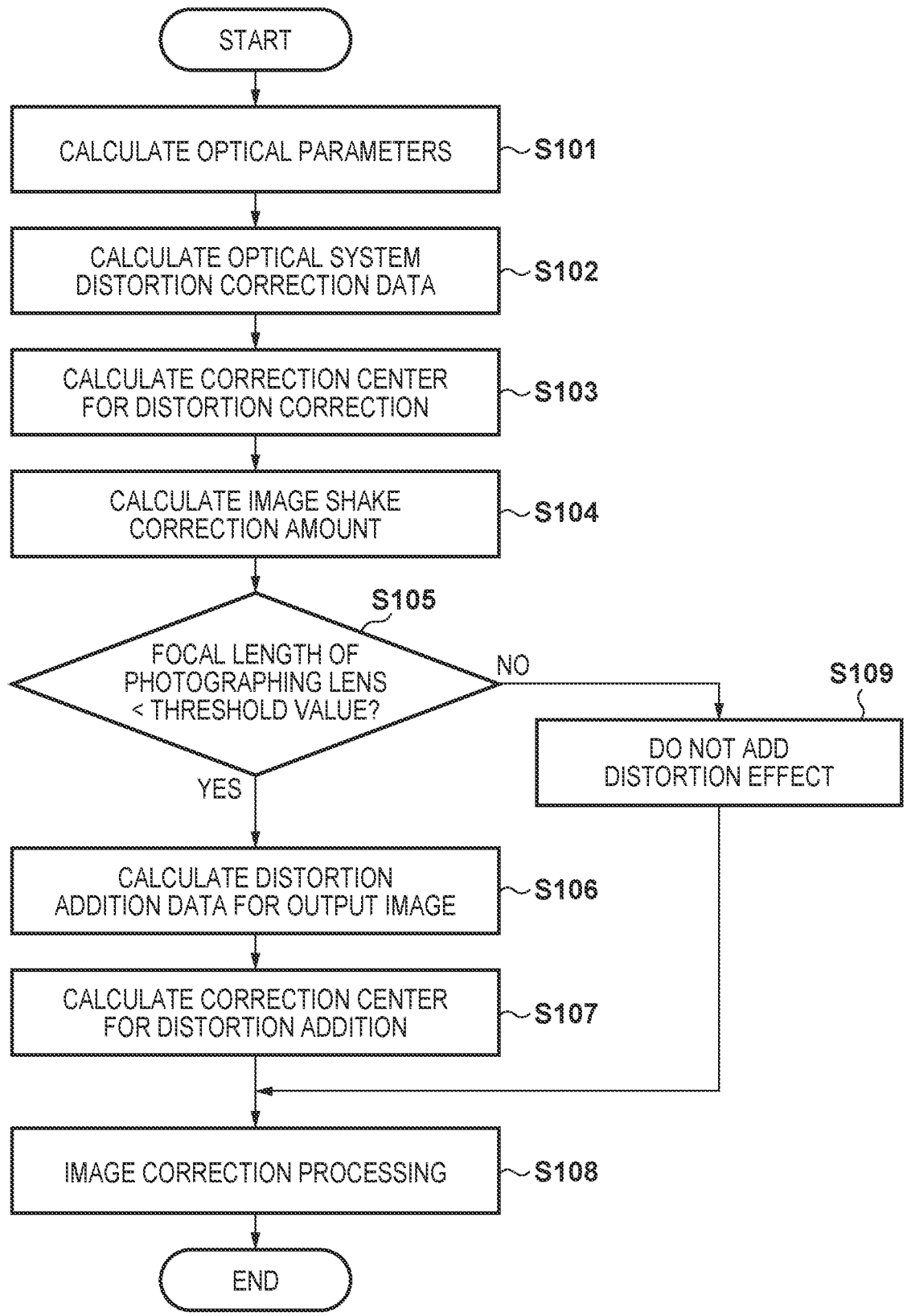
FIG. 2 is a flowchart showing an example of control according to an embodiment of the present invention.

Next, an image shake correction operation of this embodiment will be described with reference to the flowchart in FIG. 2. Here, image shake correction processing for an image of one screen will be described. Therefore, for example, as in the case where the display apparatus 110 functions as an EVF (in a shooting standby state or during shooting of a moving image to be recorded), when applying image shake correction to a moving image, the operation shown in the flowchart in FIG. 2 is repeatedly executed. Note that image shake correction does not necessarily need to be applied to all of the moving image frames.

In step S101, the optical parameter calculation circuit 201 calculates optical parameters that are used for calculating distortion characteristics of the photographing lens 102. For example, the optical parameter calculation circuit 201 calculates the focal length of the photographing lens 102 from variable magnification lens position information acquired from the photographing lens 102. Also, the optical parameter calculation circuit 201 calculates a subject distance (focus distance) from focus lens position information of the photographing lens 102. Note that these optical parameters may be acquired by referencing a table, for example, without performing calculation.

Figure 3:
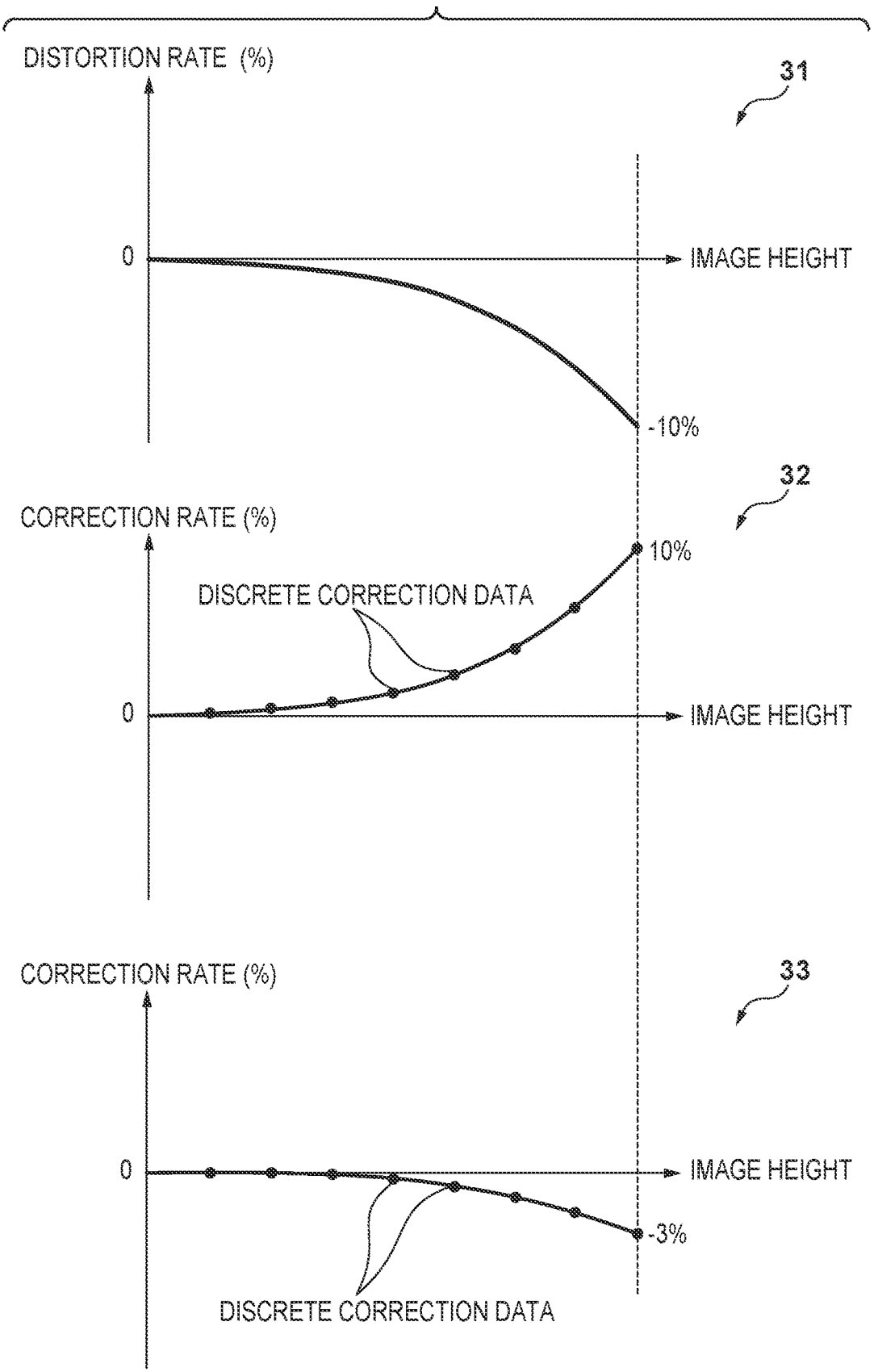
FIG. 3 is a graph for explaining distortion correction processing and distortion addition processing according to an embodiment of the present invention.

In step S102, the distortion correction amount calculation circuit 202 calculates correction data used for distortion correction that is performed by the distortion correction circuit 106. In FIGS. 3, 31 and 32 show examples of distortion characteristics of the photographing lens 102, where the horizontal axis indicates image height, and the vertical axis indicates distortion rate. A distortion rate represents a rate of change from an image height position at which an image is to be originally formed if there is no distortion. The sign of the distortion rate is positive if the direction in which the image forming position changes is a direction in which the image height increases, and is negative if the direction in which the image forming position changes is a direction in which the image height decreases. Distortion is observed as "pincushion distortion" when the distortion rate is positive, and distortion is observed as "barrel distortion" when the distortion rate is negative.

The distortion correction amount calculation circuit 202 calculates correction data according to which distortion of an image caused by aberration of the photographing lens 102 is corrected as much as possible, in order to increase the accuracy of shake correction performed by the image shake correction circuit 107. Therefore, ideally, correction data is generated such that the characteristics of the correction data are reverse characteristics of distortion characteristics of the photographing lens 102.

The distortion characteristics of the photographing lens 102 change according to optical parameters (here, a focal length and a subject distance) of the photographing lens 102. Therefore, in this embodiment, the distortion characteristics of the photographing lens 102 are stored for every combination of discrete optical parameters, for example, in the ROM of the system control circuit 101. The distortion correction amount calculation circuit 202 then reads out, from the ROM, the characteristics of distortion corresponding to combinations that are close to a combination of actual optical parameters, performs interpolation, and thereby calculates characteristics of distortion corresponding to the combination of the actual optical parameters. Subsequently, the distortion correction amount calculation circuit 202 calculates reverse characteristics of the calculated characteristics of distortion, as a group of correction data corresponding to different image heights. Note that a configuration may be adopted in which the distortion correction amount calculation circuit 202 calculates correction data only for discrete image heights as shown in 32 of FIG. 3, and correction data for another image height is acquired through interpolation performed by the distortion correction circuit 106. The distortion correction amount calculation circuit 202 supplies the correction data to the distortion correction circuit 106.

In step S103, the distortion correction amount calculation circuit 202 calculates a correction center that is used for distortion correction in the distortion correction circuit 106. The distortion correction circuit 106 corrects distortion of an image caused by aberration of the photographing lens 102. Therefore, the distortion correction amount calculation circuit 202 calculates, as a correction center, image coordinates corresponding to the intersection between the optical axis of the photographing lens 102 and the image sensor 103, and supplies the calculated image coordinates to the distortion correction circuit 106. The image coordinates of the intersection between the optical axis of the photographing lens 102 and the image sensor 103 can be stored in the ROM of the system control circuit 101 in advance based on a design value. In addition, a value corrected using the amount of deviation from a design value that occurred while the product was being manufactured may be stored. Note that a design value brings, to the center of the image, the image coordinates of the intersection between the optical axis and the image sensor is a common design value.

In step S104, the image shake correction amount calculation circuit 203 calculates an image shake correction amount based on shake data supplied from the angular velocity sensor 114 through an A/D conversion circuit, and supplies the image shake correction amount to the image shake correction circuit 107. The angular velocity sensor 114 sets at least two axes, namely, a horizontal rotation shaft (yaw) and a vertical rotation shaft (pitch) as detection axes, and an image shake correction amount is calculated for each of the detection axes. However, processing for calculating an image shake correction amount does not depend on a detection axis, and thus, for ease of description and understanding, processing for calculating an image shake correction amount using one detection axis will be described below.

Figure 4:
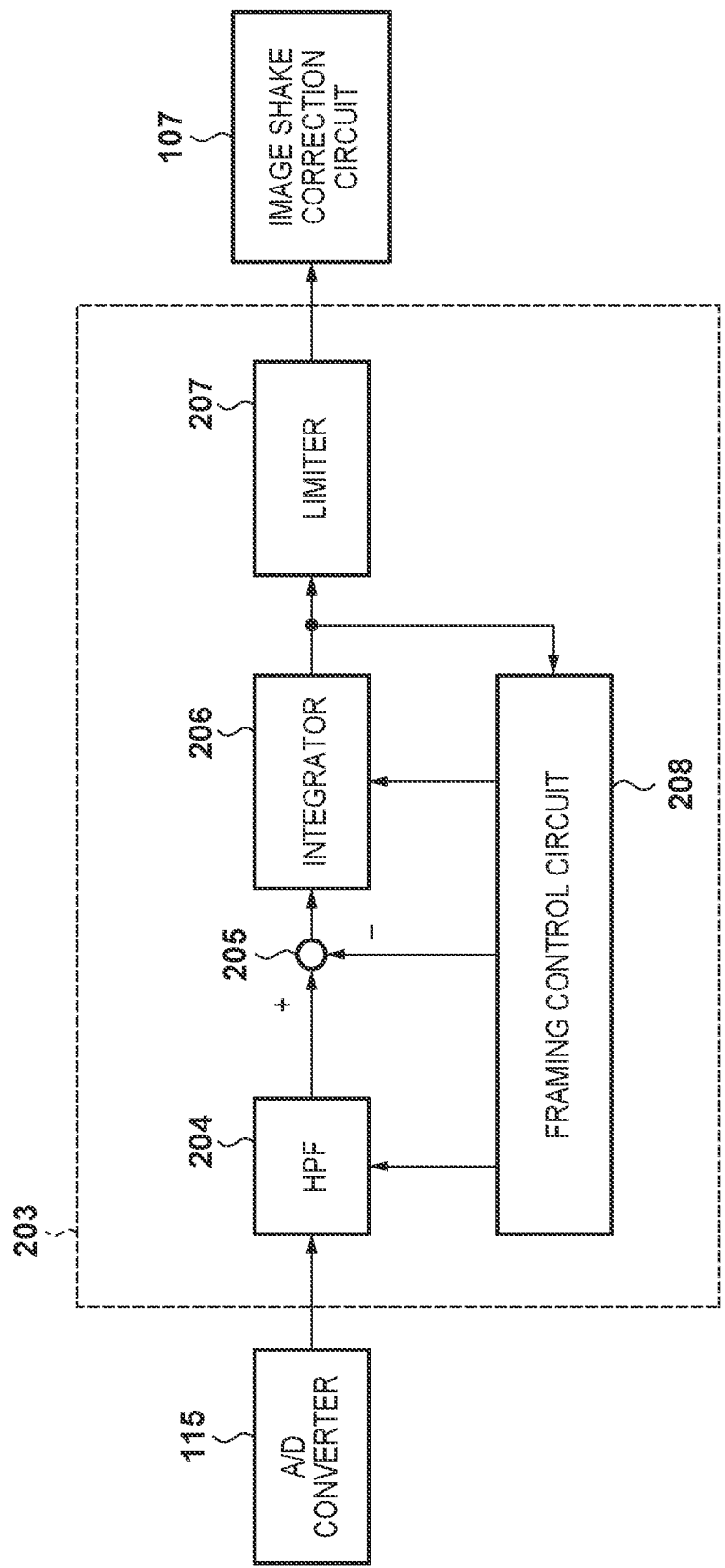
FIG. 4 is a block diagram showing a configuration example of an image shake correction amount calculation circuit 203 according to an embodiment of the present invention.

FIG. 4 is a block diagram showing the internal configuration of the image shake correction amount calculation circuit 203. A high pass filter (HPF) 204 is applied to shake data (angular velocity data) that is supplied from the A/D converter 115, so as to remove low frequency components such as DC components.

A framing control circuit 208 determines, from output of an integrator 206, whether or not a framing operation (panning or tilting) is being intentionally made by the user. If it is determined that a framing operation is being performed, the framing control circuit 208 reduces the influence of angular velocity components related to the framing operation on angular displacement data that is calculated by the integrator 206. A detailed description will be given later.

The integrator 206 integrates supplied angular velocity data, and converts the integrated angular velocity data into angle data. Also, the integrator 206 outputs angular displacement data acquired by multiplying the angle data by a predetermined coefficient, as a correction amount that is used by the image shake correction circuit 107.

Specifically, correction amounts Tx and Ty on the image plane for a shake angle $\theta y$ of yaw and a shake angle $\theta p$ of pitch are calculated using the following expressions.

$$Tx = f \times \tan \theta y / P$$

$$Ty = f \times \tan \theta p / P$$

(Note that f is focal length [mm], and P is pixel size [mm]. Here, a pixel size is the size of one side of a square pixel.)

A limiter 207 limits angular displacement data to a predetermined upper limit value.

Here, operations of the framing control circuit 208 will be further described. If angular displacement data that is output by the integrator 206 exceeds a predetermined threshold value, the framing control circuit 208 determines that a framing operation is being performed. This threshold value is smaller than the upper limit value that is set by the limiter 207, and is a value determined by performing experiments or the like in advance.

If it is determined that a framing operation is being performed, the framing control circuit 208 can reduce the components of the framing operation included in shake:

by increasing the cutoff frequency of the HPF 204, or shortening a time constant of low-pass filter (LPF) calculation included in an integration operation performed by the integrator 206, compared to the case where it is not determined that a framing operation is being performed.

Alternatively, a configuration may be adopted in which the framing control circuit 208 causes a subtractor 205 to subtract an offset from angular velocity data that is output by the HPF 204, and thereby reduces the components of the framing operation included in the shake.

Such control of the framing control circuit 208 enables excellent image shake correction, even if an intentional framing operation such as panning or tilting is being made by the user.

Returning to FIG. 2, in step S105, the distortion correction amount calculation circuit 202 determines whether or not the focal length of the photographing lens 102 is smaller than a threshold value, and if it is determined that the focal length is smaller than the threshold value, advances the procedure to step S106, and if it is not determined that the focal length is smaller than the threshold value, advances the procedure to step S109. Note that this determination in step S105 is not necessary, and the procedure may advance from step S104 to step S106 regardless of the focal length of the photographing lens 102.

Typically, an image shot using a (super) wide-angle lens such as a fisheye lens is recognized to have distortion caused by aberration as one feature. In addition, when a large amount of distortion caused by aberration is corrected, volume distortion occurs in which the image of an object reflected in a peripheral portion of an image appears to be enlarged, and thus an observer feels that something is amiss. Accordingly, it is preferred that image distortion caused by aberration does not exist for image shake correction, but, regarding an image shot with a wide-angle lens, it is actually natural that a certain degree of image distortion caused by aberration exists.

Thus, in this embodiment, if the focal length of the photographing lens 102 is smaller than the threshold value, the distortion addition circuit 108 adds a distortion effect, and if the focal length of the photographing lens 102 is larger than or equal to the threshold value, does not add a distortion effect. Here, the threshold value can be a visually desirable value if distortion that resembles aberration is added to an image.

In step S106, the distortion correction amount calculation circuit 202 calculates the characteristics of a distortion effect used by the distortion addition circuit 108. In this embodiment, a distortion effect that is added by the distortion addition circuit 108 is calculated based on the distortion characteristics of a photographing lens (i.e., the photographing lens 102) used for shooting an image subjected to image shake correction. For example, if the maximum distortion rate of the photographing lens 102 is −10% as shown in 31 of FIG. 3, distortion addition data for adding distortion (barrel distortion) whose maximum distortion rate is about −3% is calculated. This distortion addition data can be calculated by multiplying distortion correction data shown in 32 of FIG. 3 by a magnification of −3/10. Note that, here, a distortion effect of about 30% of the degree of the distortion of the photographing lens 102 is assumed to be added, but the degree of a distortion effect that is added by the distortion addition circuit 108 can be appropriately determined in a range not exceeding the intensity of distortion caused by aberration of the photographing lens 102. Alternatively, in order to simplify the processing, default distortion addition data prepared in advance may be read out regardless of the photographing lens 102.

In step S107, the distortion correction amount calculation circuit 202 calculates a correction center that is used when the distortion addition circuit 108 adds a distortion effect, supplies the correction center to the distortion addition circuit 108, and advances the procedure to step S108. The distortion correction circuit 106 uses, as a correction center, image coordinates corresponding to the intersection between the optical axis and the image sensor to correct image distortion caused by aberration of the photographing lens 102. On the other hand, due to a cropping position being changed by the image shake correction circuit 107, in an image subjected to image shake correction, the image coordinates corresponding to the intersection between the optical axis and the image sensor change over time.

Therefore, if the image coordinates corresponding to the intersection between the optical axis and the image sensor are set as a correction center when adding a distortion effect, the correction center moves in the image according to the change in the image shake correction amount. As shown in 33 of FIG. 3, a distortion effect has a distortion rate that depends on the image height (i.e. the distance between the correction center and a target pixel). Therefore, when the correction center moves over time, a distortion rate for the same image coordinates in moving image frames that have undergone image shake correction also changes over time, and a moving image that appears unnatural is obtained. Therefore, the distortion correction amount calculation circuit 202 calculates center coordinates of an image subjected to image shake correction (cropping), and supplies, to the distortion addition circuit 108, the center coordinates as a correction center when adding a distortion effect.

On the other hand, if it is not determined in step S105 that the focal length of the photographing lens 102 is smaller than the threshold value, the distortion correction amount calculation circuit 202 sets the distortion addition circuit 108 in step S109 so as to not add a distortion effect, and advances the procedure to step S108.

In step S108, the distortion correction circuit 106 performs distortion correction on image data stored in the image memory 105 based on distortion correction data and a correction center that are supplied from the distortion correction amount calculation circuit 202. In addition, the image shake correction circuit 107 performs image shake correction on the image data that is output by the distortion correction circuit 106, based on an image shake correction amount that is supplied from the image shake correction amount calculation circuit 203. If a setting for adding a distortion effect has been made, the distortion addition circuit 108 adds a distortion effect to the image data that is output by the image shake correction circuit 107, based on distortion addition data and a correction center that are supplied from the distortion correction amount calculation circuit 202, and stores the image data to the image memory 105.

Note that, here, the distortion addition circuit 108 is set to not add a distortion effect if it is not determined that the focal length of the photographing lens 102 is smaller than the threshold value. However, distortion addition data with which a distortion effect is not added may be supplied from the distortion correction amount calculation circuit 202 to the distortion addition circuit 108.

Here, image processing in the distortion correction circuit 106, the image shake correction circuit 107, and the distortion addition circuit 108 will be further described with reference to FIG. 5.

Figure 5:
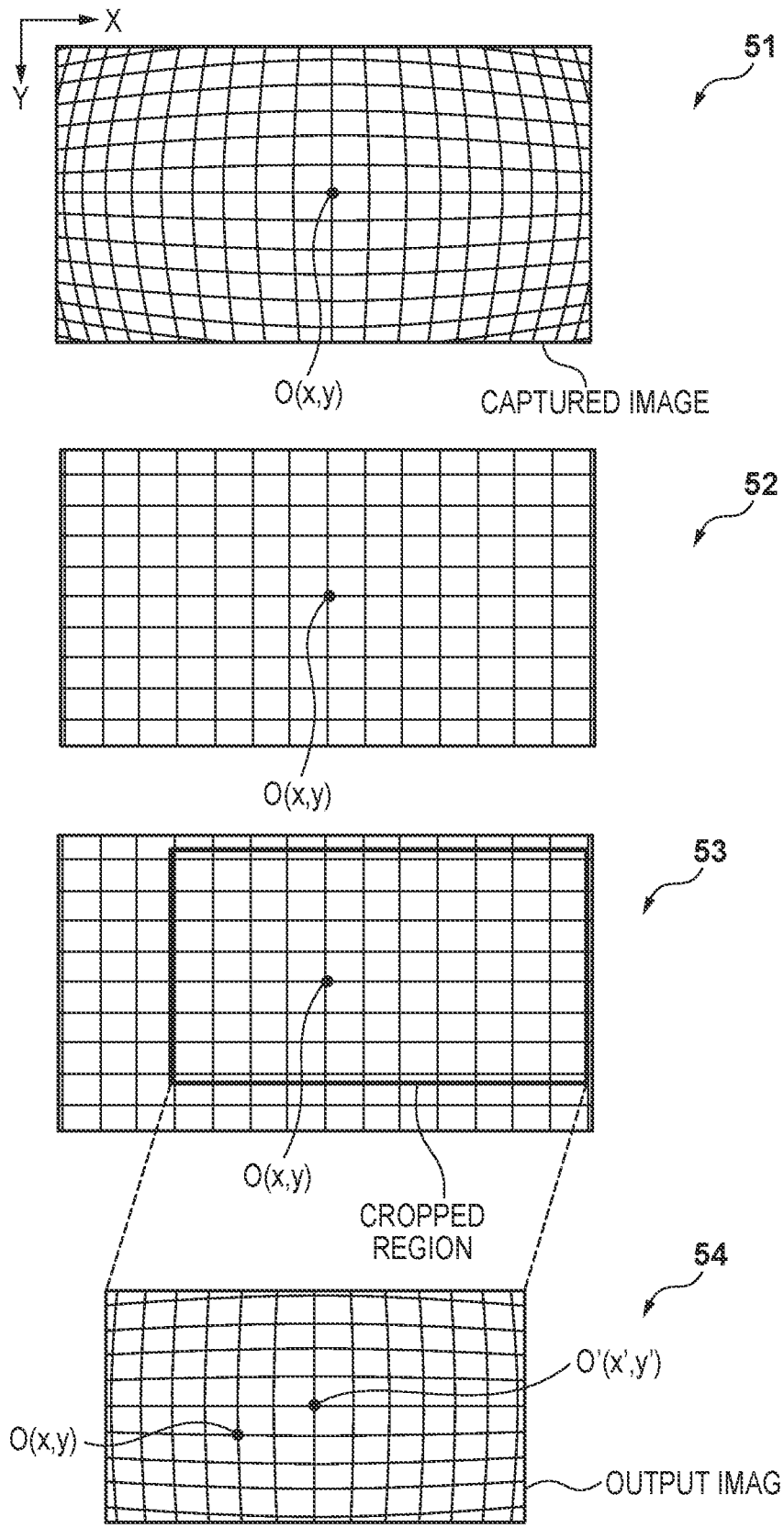
FIG. 5 is a diagram for explaining effects of distortion correction processing and distortion addition processing according to an embodiment of the present invention.

In FIG. 5, 51 schematically shows distortion of an image captured by the image sensor 103 and stored in the image memory 105. Here, barrel distortion that is centered on image coordinates (x,y) corresponding to the intersection between an optical axis O and the image sensor (which is assumed here to match the center coordinates of the image) has occurred caused by aberration of the photographing lens 102.

Image shake correction has not been performed at the time of distortion correction, and thus the image coordinates corresponding to the intersection between the optical axis O and the image sensor are still (x,y). Therefore, the distortion correction amount calculation circuit 202 supplies the coordinates (x,y) as a correction center to the distortion correction circuit 106. Due to distortion correction performed by the distortion correction circuit 106, image distortion shown in 51 of FIG. 5 is corrected (removed) (52, FIG. 5).

The image shake correction circuit 107 performs image shake correction on the image in 52 of FIG. 5 in which distortion has been corrected. The image shake correction circuit 107 determines a cropping region so as to eliminate image shake resulting from shake of the video camera 100, based on an image shake correction amount calculated by the image shake correction amount calculation circuit 203. The image shake correction circuit 107 outputs the image of the determined cropping region as an image subjected to image shake correction. Unless the image shake correction amount is 0, the image coordinates (x,y) and the center coordinates of the image subjected to image shake correction (cropping region) do not match (53, FIG. 5).

The distortion addition circuit 108 adds a distortion effect to the image subjected to image shake correction (54, FIG. 5). The image coordinates (x,y) corresponding to the intersection between the optical axis O and the image sensor do not match coordinates (x',y') of a center O' of the image subjected to image shake correction. Therefore, the distortion correction amount calculation circuit 202 supplies the center coordinates (x',y') of the image subjected to image shake correction, as a correction center when adding a distortion effect, to the distortion addition circuit 108. As a result, it is possible to add a point symmetric distortion effect in which the degree of distortion that is added to pixels equally distanced from the center of the image subjected to image shake correction is equal as shown in 54 of FIG. 5. Therefore, a distortion rate in a peripheral portion of a moving image ceases to change over time, and it is possible to generate a moving image that does not appear unnatural when observed.

Note that, in this embodiment, in order to clearly describe the gist of the invention, a configuration has been described in which the distortion correction circuit 106, the image shake correction circuit 107, and the distortion addition circuit 108 independently apply distortion correction processing, image shake correction processing, and distortion effect addition processing, respectively. However, a configuration may be adopted in which the distortion correction processing, image shake correction processing, and distortion effect addition processing are totaled into one coordinate conversion based on a correction amount and a correction center in the respective processing, and are applied to image data stored in the image memory 105. With such a configuration, it is possible to perform distortion correction processing, image shake correction processing, and distortion effect addition processing at the same time, and correction processing of image data is performed at a time. Alternatively, a configuration may be adopted in which coordinate conversion for correcting the distortion characteristics of a photographing lens and coordinate conversion for adding a distortion effect are totaled, and according to the result of this totaling, processing for correcting distortion and processing for adding a distortion effect are applied to image data, and image cropping for image shake correction is then performed.

As described above, in this embodiment, transformation processing is performed on an image including distortion caused by aberration of a photographing lens to correct the distortion caused by aberration and image shake, and an image to which a distortion effect has been added using the center coordinates of the image as a correction center is generated. Therefore, even in the case of adding a distortion effect to moving image frames, it is possible to suppress the distortion rate in a peripheral portion from changing over time, and to generate a moving image that does not appear unnatural. Furthermore, by performing image shake correction on an image in which distortion caused by aberration of a photographing lens has been corrected, accurate image shake correction can be achieved. In addition, by adding a distortion effect if the focal length of a photographing lens is smaller than a threshold value, it is possible to generate a moving image that shows an effect of wide angle shooting.

Second Embodiment

Next, a second embodiment of the present invention will be described. The first embodiment is directed to an image capturing apparatus that changes a cropping region of a captured image and performs image shake correction, but this embodiment is different from the first embodiment in that this embodiment is directed to an image capturing apparatus that performs image shake correction by driving an optical member.

Figure 6:
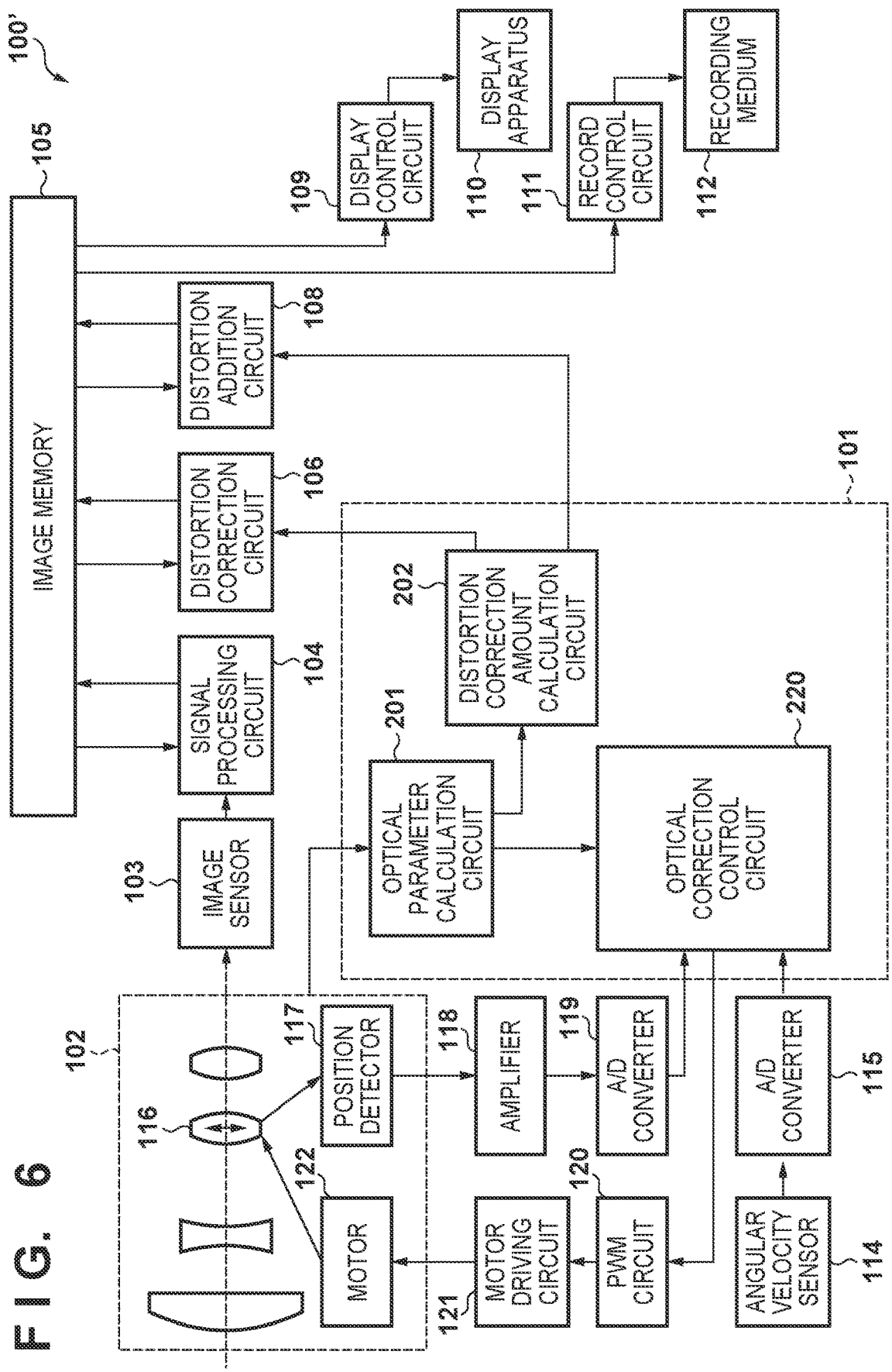
FIG. 6 is a block diagram showing a configuration example of an image capturing apparatus according to a second embodiment of the present invention.

FIG. 6 is a block diagram showing an example of a function configuration of a video camera 100' according to this embodiment. In FIG. 6, the same reference numerals as those in FIG. 1 are assigned to the same constituent elements as the first embodiment, and description regarding constituent elements described in the first embodiment is omitted.

The video camera 100' includes constituent elements for optically correcting image shake in place of the constituent elements (the image shake correction circuit 107 and the image shake correction amount calculation circuit 203) for electronically correcting image shake, from among the constituent elements of the first embodiment. Specifically, a photographing lens 102 is provided with a correction optical system 116, and is provided with constituent elements (118 to 121) for driving the correction optical system 116 and an optical correction control circuit 220 that controls the constituent elements. Here, the optical correction control circuit 220 may be constituted by hardware equipped with dedicated calculation circuits for achieving respective functions, or may be configured to be achieved by a CPU of a system control circuit 101 executing programs. Note that, in FIG. 6, the correction optical system 116 is driven, but alternatively or additionally, an image sensor 103 and the entirety of the photographing lens 102 may be driven.

The correction optical system 116 is a shift lens, for example, and can move to change the direction of the optical axis of the photographing lens 102 (the intersection between the optical axis and the image sensor). The optical correction control circuit 220 moves the correction optical system 116 so as to eliminate shake of the video camera 100', and thereby a subject image in which image shake has been corrected is formed on the imaging plane of the image sensor 103.

A position detector 117 outputs a voltage according to the position of the correction optical system 116. This voltage is amplified by the amplifier 118, then digitized by the A/D converter 119, and supplied as position data to the optical correction control circuit 220.

The optical correction control circuit 220 calculates shake correction data based on shake data that is supplied from an A/D converter 115. Shake correction data represents a target position to which the correction optical system 116 is to be driven. The optical correction control circuit 220 drives the correction optical system 116 based on the difference between the position of the correction optical system 116 supplied by the A/D converter 119 and the target position. The configuration and operations of the optical correction control circuit 220 will be described later.

A PWM circuit 120 modulates data (deviation data) that is output by the optical correction control circuit 220, and that represents the difference between the target position and the current position, to a wave form (PWM wave form) for changing the duty ratio of a pulse wave, and supplies the modulated data to a motor driving circuit 121. The motor driving circuit 121 drives a motor 122 that is a voice coil type motor, for example, based on the PWM wave form supplied from the PWM circuit 120. The correction optical system 116 moves according to a driving direction and a driving amount of the motor 122.

Subsequently, deviation data is calculated, and the correction optical system 116 is driven based on the position and shake data of the correction optical system 116 that moved. In this manner, the optical correction control circuit 220 performs feedback control on the position of the correction optical system 116 such that the difference between the driving target position and the position data is small. Accordingly, the correction optical system 116 is driven so as to follow the driving target position.

Figure 7:
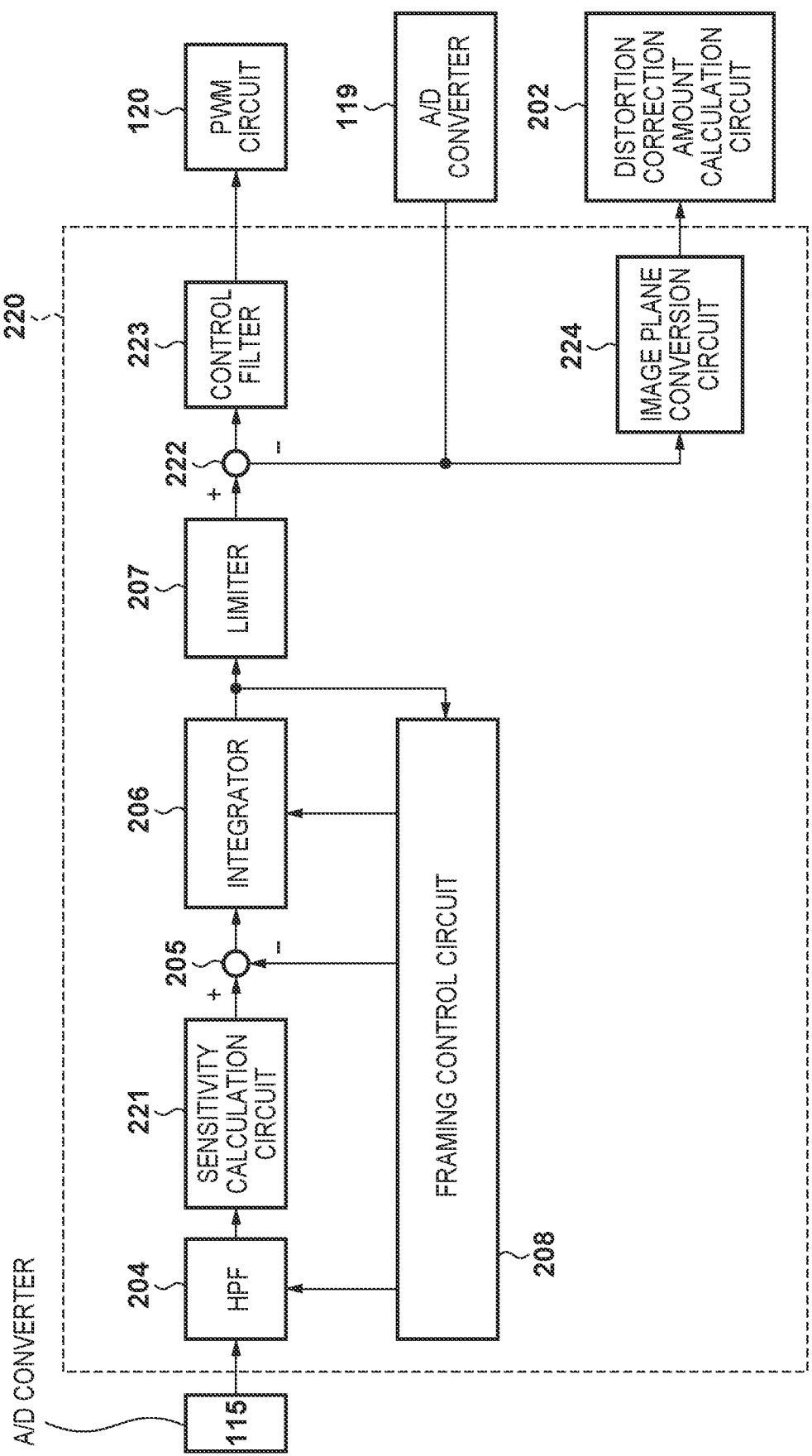
FIG. 7 is a block diagram showing a configuration example of an optical correction control circuit 220 according to the second embodiment of the present invention.

FIG. 7 is a block diagram schematically showing processing of the optical correction control circuit 220, where the same reference numerals as those in FIG. 4 are assigned to blocks that perform processing similar to that of the image shake correction amount calculation circuit 203 of the first embodiment. A sensitivity calculation circuit 221 converts angular velocity data into a movement amount of the correction optical system 116, using focal length information acquired from an optical parameter calculation circuit 201. Output of an integrator 206 that integrates a movement amount that has undergone framing control similar to the first embodiment represents a displacement amount (target position) of the correction optical system 116 that depends on the magnitude and direction of the shake. A limiter 207 limits a displacement amount to be within the movable range of the correction optical system.

A subtractor 222 acquires the difference between the target position of the correction optical system 116 that is output by the limiter 207 and the current position of the correction optical system 116 that is output by the A/D converter 119, and supplies the difference as deviation data to a control filter 223. The control filter 223 applies signal processing such as amplification and phase compensation to the deviation data, and then, supplies the processed deviation data to the PWM circuit 120.

An image plane conversion circuit 224 converts positional information of the correction optical system 116 that is output by the A/D converter 119, into a movement amount and movement direction assuming that the position of the optical axis position on the image sensor when the correction optical system 116 is not moving is a reference position, and supplies the movement amount and the direction of movement to a distortion correction amount calculation circuit 202. The position of the optical axis position on the image sensor when the correction optical system 116 is not moving generally corresponds to the center position of the image sensor 103 or to the center position of an image captured by the image sensor, as being described later.

Note that processing for one detection axis of an angular velocity sensor 114 has been described here as well, but similar processing is executed for another detection axis.

Such processing makes it possible to optically correct image shake caused by shake of the video camera 100'.

Figure 8:
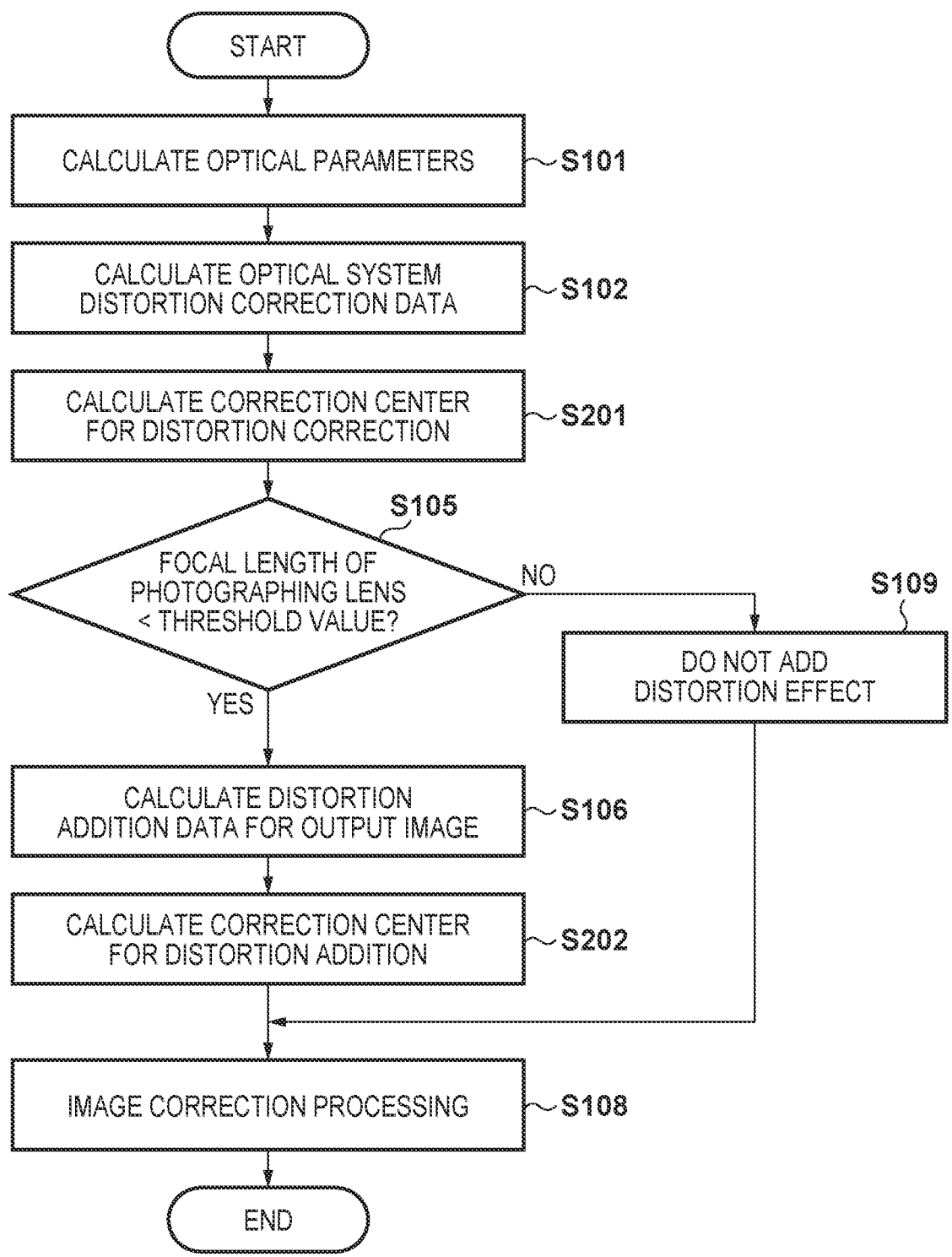
FIG. 8 is a flowchart showing an example of control according to the second embodiment of the present invention.

Next, an image shake correction operation of this embodiment will be described with reference to the flowchart in FIG. 8. In FIG. 8, the same reference numerals as those in FIG. 2 are assigned to the same processing as in the first embodiment. This embodiment is similar to the first embodiment except that there is no processing for calculating an image shake correction amount (step S104) since image shake correction is optically performed in this embodiment, and contents of processing for calculating a correction center (steps S201 and S202) are different.

Processing for calculating a correction center performed by a distortion correction circuit 106 in step S201 will be described. Also in this embodiment, distortion correction performed by the distortion correction circuit 106 is processing for correcting distortion in a captured image caused by aberration of the photographing lens 102. Therefore, it is necessary to carry out distortion correction in which image coordinates corresponding to the intersection between the optical axis of the photographing lens 102 and the image sensor 103 serve as a correction center.

In the first embodiment, in a captured image (moving image frame) that is to be subjected to distortion correction, the image coordinates corresponding to the intersection between the optical axis of the photographing lens 102 and the image sensor 103 are fixed. Therefore, even in the case where deviation from a design value due to an assembly error is taken into consideration, a correction center in distortion correction does not change.

However, in this embodiment, an image subjected to optical image shake correction is shot, and thus the intersection between the optical axis of the photographing lens 102 and the image sensor 103 changes according to the position of the correction optical system 116. Therefore, it is necessary to obtain a correction center of distortion correction that is performed by the distortion correction circuit 106, based on the position of the correction optical system 116, and supply the correction center to the distortion correction circuit 106.

As described with reference to FIG. 7, a value acquired by converting the current position of the correction optical system 116 into a movement amount using the position of the optical axis on the image sensor 103 when the correction optical system 116 is not moving is as a reference position, is supplied from the optical correction control circuit 220 to the distortion correction amount calculation circuit 202. The distortion correction amount calculation circuit 202 can calculate image coordinates corresponding to the intersection between the current optical axis of the photographing lens 102 and the image sensor 103, by applying the movement amount of the optical axis that is acquired from the current position of the correction optical system 116 to the initial position of the optical axis. Here, the initial position of the optical axis represents image coordinates corresponding to the intersection between the optical axis of the photographing lens 102 and the image sensor 103 when the correction optical system 116 is not moving. The distortion correction amount calculation circuit 202 supplies the image coordinates of the correction center calculated in this manner to the distortion correction circuit 106.

Also in this embodiment, similar to the first embodiment, the center coordinates of an image that are lastly output when a distortion addition circuit 108 adds a distortion effect are used as a correction center. Note that, in the case of adding a distortion effect to the entirety of an image subjected to distortion correction, a correction center is at fixed coordinates. Also in the case of performing cropping, if the center of a cropping region is the same as the center of the image subjected to distortion correction, the correction center is at fixed coordinates.

Other processing may be the same as the first embodiment except that image shake correction is not performed in step S108, and thus a description thereof is omitted.

Figure 9:
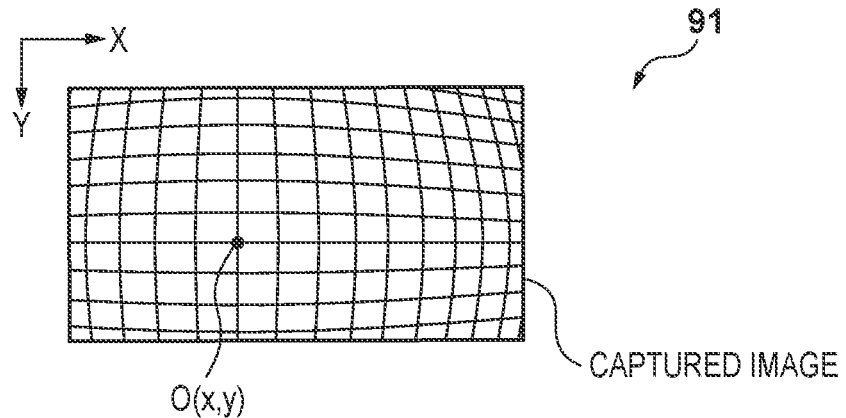
FIG. 9 is a diagram for explaining effects of distortion correction processing and distortion addition processing according to the second embodiment of the present invention.
Figure 9:
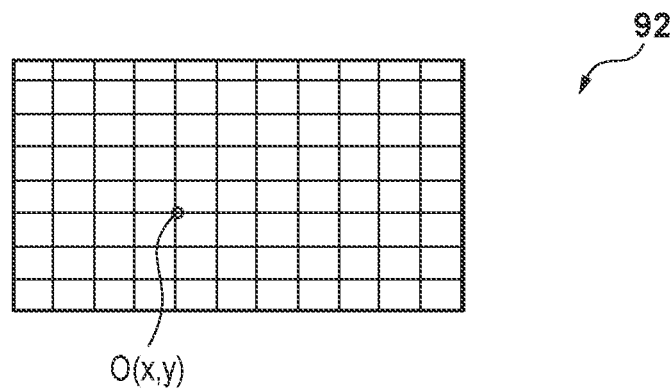
Figure 9:
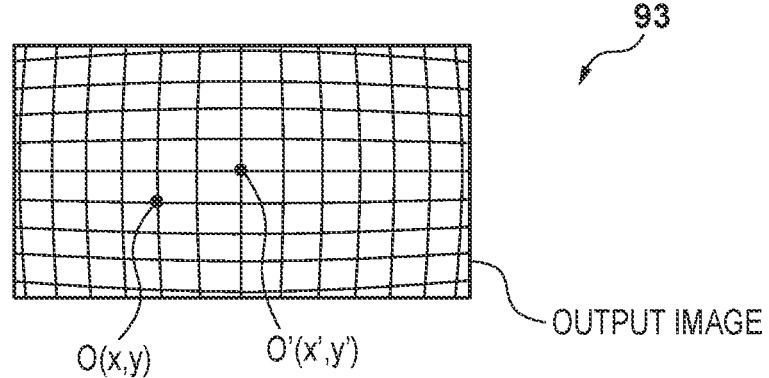

FIG. 9 schematically shows image processing in the distortion correction circuit 106 and the distortion addition circuit 108, similar to FIG. 5.

In FIG. 9, 91 schematically shows distortion of an image captured by the image sensor 103 and stored in an image memory 105. Here, caused by aberration of the photographing lens 102, barrel distortion centered on image coordinates (x,y) corresponding to the intersection between an optical axis O and the image sensor has occurred in the image. Since the correction optical system 116 has moved, the image coordinates (x,y) and the center coordinates of the image do not match.

The distortion correction amount calculation circuit 202 supplies the coordinates (x,y) as a correction center to the distortion correction circuit 106. Due to distortion correction performed by the distortion correction circuit 106, image distortion shown in 91 of FIG. 9 is corrected (removed) (92, FIG. 9). At this time, an image in which image shake and distortion caused by aberration have been corrected is acquired.

Subsequently, the distortion correction amount calculation circuit 202 supplies center coordinates (x',y') of the image as a correction center when adding a distortion effect, to the distortion addition circuit 108. Accordingly, the distortion addition circuit 108 can add a point symmetric distortion effect in which the magnitude of distortion that is added to pixels equally distanced from the center of the image is equal, as shown in 93 of FIG. 9. Therefore, a distortion rate in a peripheral portion of a moving image ceases to change over time, and it is possible to generate a moving image that does not appear unnatural when observed.

As described above, according to this embodiment, also in the case of optically correcting image shake, distortion caused by aberration of an optical system is corrected by performing transformation processing on an image that includes the distortion caused by aberration, and an image to which a distortion effect has been added using the center coordinates of the image as a correction center is generated. Accordingly, a similar effect to that of the first embodiment is acquired.

Third Embodiment

Next, a third embodiment of the present invention will be described. This embodiment can be achieved in combination with the first embodiment and the second embodiment.

In the first and second embodiments, a configuration is adopted in which, if the focal length of the photographing lens 102 is smaller than a threshold value, a distortion effect is added, and if the focal length of the photographing lens 102 is larger than or equal to the threshold value, a distortion effect is not added.

On the other hand, there are cases where, in a video camera whose lens is not interchangeable and the like, a conversion lens 150 (FIG. 1) that is mounted to a photographing lens 102 in order to change the focal length of the photographing lens 102 is used. In this embodiment, control performed in the case where a detachable conversion lens (or an attachment lens) is attached to the photographing lens 102 of a video camera 100 or 100' will be described.

Figure 10:
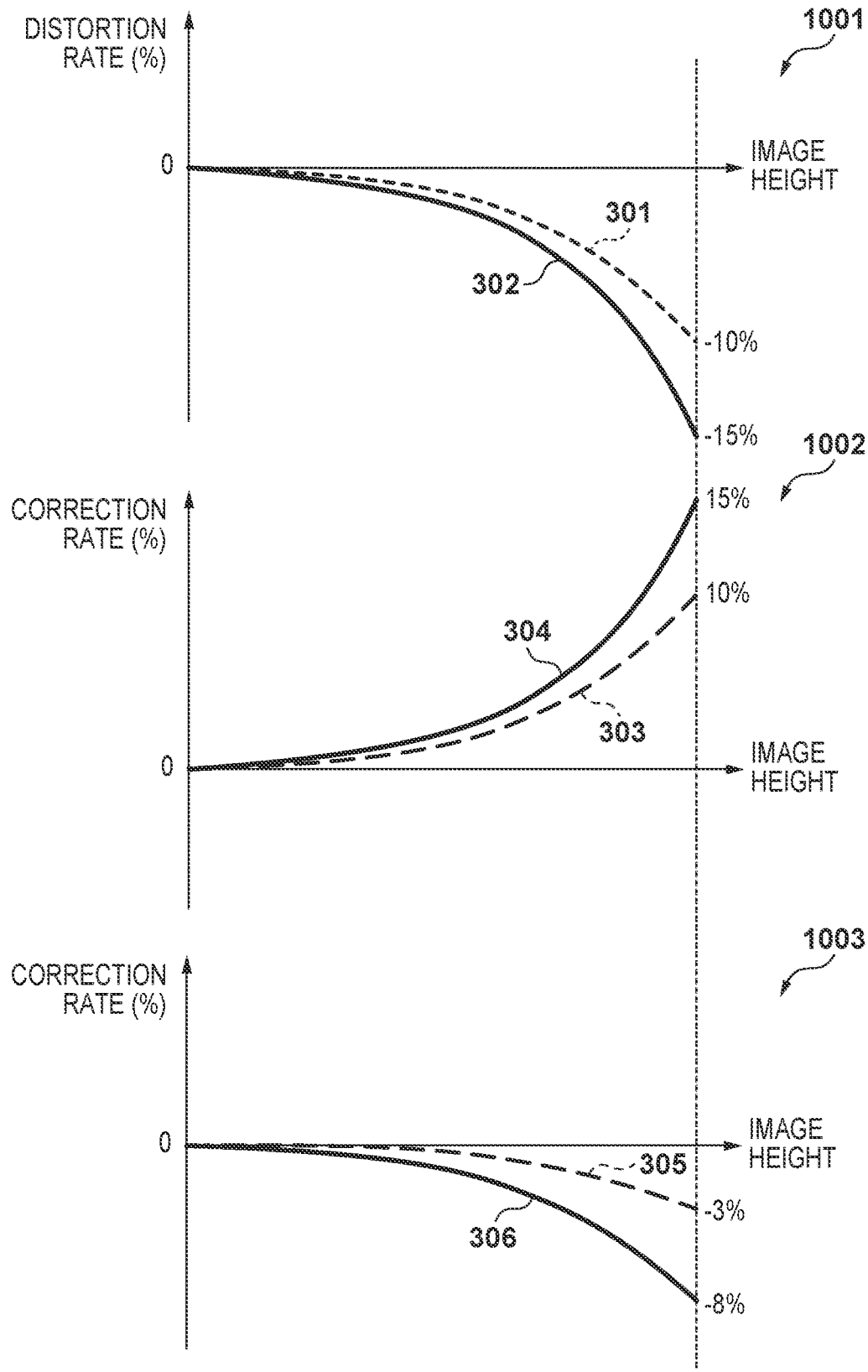
FIG. 10 is a graph for explaining distortion correction processing and distortion addition processing according to a third embodiment of the present invention.

In FIG. 10, 1001 shows a distortion characteristic 301 of the photographing lens 102 alone and a distortion characteristic 302 of the entire optical system when a wide conversion lens is attached to the photographing lens 102 (combination of a photographing lens and a wide conversion lens). A wide conversion lens enables wider angle shooting than the photographing lens 102, but causes more intense barrel distortion. In the example of 1001 of FIG. 10, the maximum distortion rate of the photographing lens 102 alone is −10% while the maximum distortion rate in the case where a wide conversion lens is attached is −15%, and barrel distortion is more intense.

A system control circuit 101 can electrically or mechanically detect whether or not a wide conversion lens is attached, for example, by using a switch 151 (FIG. 1). Alternatively, a configuration may be adopted in which a setting regarding whether or not a wide conversion lens is attached can be changed by the user through a menu screen, and the system control circuit 101 determines whether or not a wide conversion lens is attached, in accordance with the setting content.

If the system control circuit 101 determines that a conversion lens is attached, a distortion correction amount calculation circuit 202 calculates correction data for correcting the distortion characteristic 302 of the entire optical system including the conversion lens. For example, the distortion correction amount calculation circuit 202 calculates correction amounts corresponding to a plurality of discrete image heights according to a reverse characteristic of the distortion characteristic 302 in 1001 of FIG. 10 that is denoted by reference numeral 304 in 1002 of FIG. 10.

Next, calculation of distortion addition data when a wide conversion lens is attached will be described. By attaching a wide conversion lens, the maximum distortion rate of distortion of the entire optical system increases from 10% to 15%. Therefore, similarly, if it is determined that a wide conversion lens is attached, a distortion effect that is added by a distortion addition circuit 108 is more intense than a distortion effect that is added if it is not determined that a wide conversion lens is attached.

For example, the characteristic of distortion addition data if it is determined that a wide conversion lens is not attached is denoted by reference numeral 305 in 1003 of FIG. 10. In this case, if it is determined that a wide conversion lens is attached, the distortion correction amount calculation circuit 202 generates distortion addition data with an increased distortion maximum distortion rate. The distortion correction amount calculation circuit 202 can generate distortion addition data having a characteristic denoted by reference numeral 306 in the example shown in 1003 of FIG. 10, for example. Here, it is assumed that the distortion correction amount calculation circuit 202 generates distortion addition data for adding the distortion effect 306 having a characteristic of offsetting the difference between correction amount characteristics 303 and 304. In other words, the distortion correction amount calculation circuit 202 generates distortion addition data for adding a distortion effect that is equivalent to distortion caused by a conversion lens or an attachment lens. This makes it possible to prevent the angle of view that was widened by a wide conversion lens from being narrowed as a result of performing distortion correction. It is also possible to reduce the influence of volume distortion that increases as a result of a wide conversion lens being attached, and to generate a natural moving image.

As described above, according to this embodiment, even in the state where a conversion lens or an attachment lens is attached, and the characteristics of distortion of the entire optical system change, it is possible to acquire an effect similar to those of the first and second embodiments.

Other Embodiments

The present invention has been described above based on exemplary embodiments, but the present invention is not limited to these specific embodiments, and various modifications can be made within the scope of the invention. In addition, in the above embodiments, a configuration has been described in which shake of the apparatus is detected by an angular velocity sensor, but another configuration may be used for detection. For example, shake amount may be calculated from acceleration detected by acceleration sensor, or shake amount of the apparatus may be calculated by detecting movement information from a captured image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-82252, filed on Apr. 18, 2017, and No. 2018-28211, filed on Feb. 20, 2018, which are hereby incorporated by reference herein in their entirety.

What is claimed is:

1. An image processing apparatus comprising:
a processor for generating a second image by applying one or more processes to a first image captured via an optical system,
wherein if the first image is an image that includes distortion caused by aberration of the optical system and the image center coordinates and the coordinates corresponding to a center of the aberration do not match,
the processor generates the second image to have point symmetric distortion centered on the image center coordinates by applying a transformation process to the first image.

2. The image processing apparatus according to claim 1,
wherein the processor applies, as the transformation process, a process for correcting image distortion caused by aberration of the optical system and a process for adding a distortion effect having a distortion rate that corresponds to a distance from the center coordinates of the second image.

3. The image processing apparatus according to claim 2,
wherein the processor applies the process for correcting image distortion caused by aberration of the optical system, and after that, applies the process for adding a distortion effect.

4. The image processing apparatus according to claim 2,
wherein the processor applies the process for correcting image distortion caused by aberration of the optical system and the process for adding a distortion effect at the same time.

5. The image processing apparatus according to claim 2,
wherein the first image is an image in which image shake has been corrected by an image shake correction apparatus that optically corrects image shake.

6. The image processing apparatus according to claim 5,
wherein the image shake correction apparatus optically corrects image shake by driving the entire optical system or a correction optical system and/or an image sensor according to shake of the apparatus.

7. The image processing apparatus according to claim 2,
wherein the one or more processes include a process for cropping a region that corresponds to shake of the apparatus.

8. The image processing apparatus according to claim 7,
wherein the processor applies, to the first image, the process for correcting image distortion caused by aberration of the optical system, the process for cropping a region that corresponds to shake of the apparatus, and the process for adding a distortion effect, in this stated order.

9. The image processing apparatus according to claim 7,
wherein the processor applies, to the first image, the process for correcting image distortion caused by aberration of the optical system and the process for adding a distortion effect, and, after that, applies the process for cropping a region that corresponds to shake of the apparatus.

10. The image processing apparatus according to claim 7,
wherein the processor applies, to the first image, the process for correcting image distortion caused by aberration of the optical system, the process for cropping a region that corresponds to shake of the apparatus, and the process for adding a distortion effect, at the same time.

11. The image processing apparatus according to claim 2, wherein the processor sets image coordinates corresponding to an intersection between an optical axis of the optical system and an image sensor, as coordinates corresponding to a center of the aberration.

12. The image processing apparatus according to claim 2, further comprising:
a detector for detecting that an auxiliary lens that changes a focal length of the optical system is attached,
wherein, if it is detected that the auxiliary lens is attached, the processor performs the process for correcting image distortion caused by aberration of the optical system and the auxiliary lens.

13. The image processing apparatus according to claim 12,
wherein, if it is detected that the auxiliary lens is attached, the processor adds a distortion effect that is based on aberration caused by the auxiliary lens.

14. The image processing apparatus according to claim 2, wherein, if a focal length of the optical system is smaller than a threshold value, the processor adds the distortion effect, and if the focal length of the optical system is larger than or equal to the threshold value, the processor does not add the distortion effect.

15. The image processing apparatus according to claim 1, wherein a distortion rate of the second image is smaller than a distortion rate of distortion caused by aberration of the optical system.

16. The image processing apparatus according to claim 1, wherein the first image is a moving image frame.

17. An image processing apparatus comprising:
at least one processor;
a first memory; and
a nonvolatile second memory that includes instructions for the at least one processor to, by being executed by the at least one processor:
read out a first image that includes distortion caused by aberration of an optical system, from the first memory;
generate a second image by performing, on the first image, a process for correcting distortion caused by aberration of the optical system;
generate a third image by cropping a portion of the second image according to a shake amount of an image capturing apparatus; and
generate a fourth image that includes a point symmetric distortion centered on the image center coordinates, by performing a transformation process on the third image.

18. The image processing apparatus according to claim 17,
wherein the second memory includes an instruction for the at least one processor to, by being executed by the at least one processor:
output the fourth image to a display apparatus and/or a storage medium.

19. An image processing apparatus comprising:
at least one processor;
a first memory;
a nonvolatile second memory that includes instructions for the at least one processor to, by being executed by the at least one processor:
read out a first image that includes distortion caused by aberration of an optical system, from the first memory;
in the first image, correct distortion caused by aberration of the optical system, crop a portion of the image according to a shake amount of an image capturing apparatus, and perform coordinate conversion calculation for adding a point symmetric distortion centered on the image center coordinates; and
apply, to the first image, a transformation process that is based on a result of the coordinate conversion calculation.

20. The image processing apparatus according to claim 19,
wherein the second memory further includes an instruction for the at least one processor to, by being executed by the at least one processor:
output an image to which the transformation process has been applied, to a display apparatus and/or a storage medium.

21. An image processing method comprising:
generating a second image by applying one or more processes to a first image captured via an optical system,
wherein if the first image is an image that includes distortion caused by aberration of the optical system and the image center coordinates and the coordinates corresponding to a center of the aberration do not match,
the second image that includes a point symmetric distortion centered on the image center coordinates is generated by applying a transformation process to the first image.

22. A non-transitory storage medium for storing a program that can be executed by a processor,
wherein, when executed by the processor, the program causes the processor to execute an image processing method comprising:
generating a second image by applying one or more processes to a first image captured via an optical system,
wherein if the first image is an image that includes distortion caused by aberration of the optical system and the image center coordinates and the coordinates corresponding to a center of the aberration do not match,
the second image that includes a point symmetric distortion centered on the image center coordinates is generated by applying a transformation process to the first image.

* * * * *